US 6,676,145 B2

(12) United States Patent
Carlstedt et al.

(10) Patent No.: US 6,676,145 B2
(45) Date of Patent: Jan. 13, 2004

(54) MOVABLE UPPER SUSPENSION MOUNT

(75) Inventors: Robert P. Carlstedt, Rochester Hills, MI (US); Mark C. Smith, Troy, MI (US); Steven M. Foster, Rochester, MI (US); Daniel Eugene Whitney, Arlington, MA (US); Eric Stephen Geib, Fenton, MI (US); Richard M. Clisch, Canton, MI (US); Shan Shih, Troy, MI (US); Juan J. Marcos Munoz, Navara (SE)

(73) Assignee: Meritor Light Vehicle Technology, LLC, Troy, MI (US)

( * ) Notice: Subject to any disclaimer, the term of this patent is extended or adjusted under 35 U.S.C. 154(b) by 178 days.

(21) Appl. No.: 10/037,820

(22) Filed: Jan. 3, 2002

(65) Prior Publication Data
US 2003/0122343 A1 Jul. 3, 2003

(51) Int. Cl.$^7$ .............................................. B60G 15/00
(52) U.S. Cl. ...................... 280/124.146; 280/124.147; 280/86.752
(58) Field of Search ...................... 280/86.752, 124.146, 280/124.147

(56) References Cited

U.S. PATENT DOCUMENTS

| | | | |
|---|---|---|---|
| 1,556,531 A | | 10/1925 | McMillin |
| 2,678,830 A | | 5/1954 | Cigan et al. |
| 2,907,578 A | | 10/1959 | Taber |
| 3,469,859 A | * | 9/1969 | Giacosa ............... 280/124.146 |
| 3,751,061 A | | 8/1973 | Scheuerpflug |
| 4,159,125 A | * | 6/1979 | Buchwald ............ 280/124.146 |
| 4,236,728 A | | 12/1980 | Policy et al. |
| 4,371,191 A | | 2/1983 | Goldberg et al. |
| 4,700,972 A | | 10/1987 | Young |
| 4,726,603 A | | 2/1988 | Sugiyama et al. |
| 4,738,458 A | | 4/1988 | Warner |
| 4,747,614 A | | 5/1988 | Kuroyanagi et al. |

(List continued on next page.)

FOREIGN PATENT DOCUMENTS

| | | | |
|---|---|---|---|
| EP | 1 190 875 | * | 9/2001 |
| GB | 2 229 976 | * | 10/1990 |
| GB | 2 306 412 | * | 5/1997 |
| JP | 6-183234 | * | 5/1994 |
| JP | 11-115809 | * | 4/1999 |
| JP | 2002-225528 | * | 8/2002 |

Primary Examiner—Paul N. Dickson
Assistant Examiner—George D Spisich
(74) Attorney, Agent, or Firm—Carlson, Gaskey & Olds

(57) ABSTRACT

A suspension assembly is provided for a vehicle including a frame. A lower control arm having first and second opposing portions is pivotally connected to the frame at the first portion. A knuckle is supported on the second portion of the lower control arm with a wheel supported on the knuckle. A strut having a lower end is connected to the knuckle and an upper end of the strut is connected to the frame at an upper connection. The upper connection generally constrains the upper end of the strut against vertical movement while permitting limited lateral movement of the upper end relative to the frame. In one embodiment, a linkage assembly including a first link is operatively connected between the lower control arm and the frame. A second link interconnects the upper end of the strut and the first link portion for moving the upper end laterally in the upper connection in response to vertical movement of the lower control arm. In a second embodiment, an adjustable linkage assembly including a first adjustable linkage is interconnected between the upper end and the frame. A second adjustable linkage is interconnected between the lower control arm and the frame and changes length in response to vertical movement of the lower control arm. A link interconnects the first and second adjustable linkages for communicating the change in length of the second adjustable linkage to the first adjustable linkage for moving the upper end laterally in the upper connection in response to vertical movement of the lower control arm.

6 Claims, 1 Drawing Sheet

U.S. PATENT DOCUMENTS

| | | | |
|---|---|---|---|
| 4,756,517 A | | 7/1988 | Kakimoto |
| 4,811,969 A | | 3/1989 | Sugiyama |
| 4,835,714 A | | 5/1989 | Sano et al. |
| 4,911,466 A | * | 3/1990 | Blair .................. 280/124.146 |
| 4,971,348 A | | 11/1990 | Oyama et al. |
| 4,973,070 A | | 11/1990 | Menichini et al. |
| 4,995,633 A | | 2/1991 | Santo |
| 5,292,149 A | | 3/1994 | Luger |
| 5,372,377 A | | 12/1994 | Lee |
| 5,374,076 A | | 12/1994 | Lee |
| 5,380,035 A | | 1/1995 | Lee |
| 5,405,162 A | | 4/1995 | Chun |
| 5,438,575 A | | 8/1995 | Bertrand |
| 5,481,458 A | | 1/1996 | Harara et al. |
| 5,560,637 A | | 10/1996 | Lee |
| 5,810,383 A | * | 9/1998 | Anderson ............ 280/124.116 |
| 5,979,919 A | | 11/1999 | Bruehl |
| 6,193,251 B1 | * | 2/2001 | Jung .................. 280/124.146 |
| 6,244,607 B1 | * | 6/2001 | Nishino ............... 280/124.107 |
| 6,250,659 B1 | * | 6/2001 | Morris ................ 280/124.147 |
| 2003/0122336 A1 | * | 7/2003 | Zadok ................. 280/124.106 |

* cited by examiner

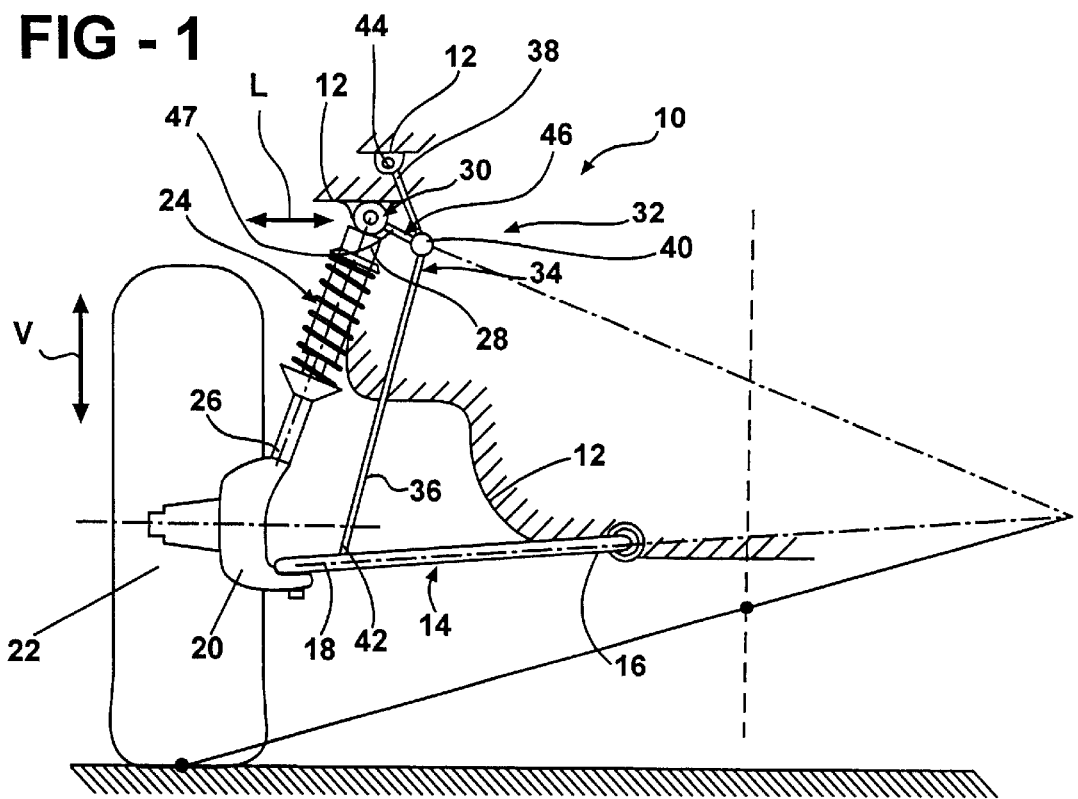
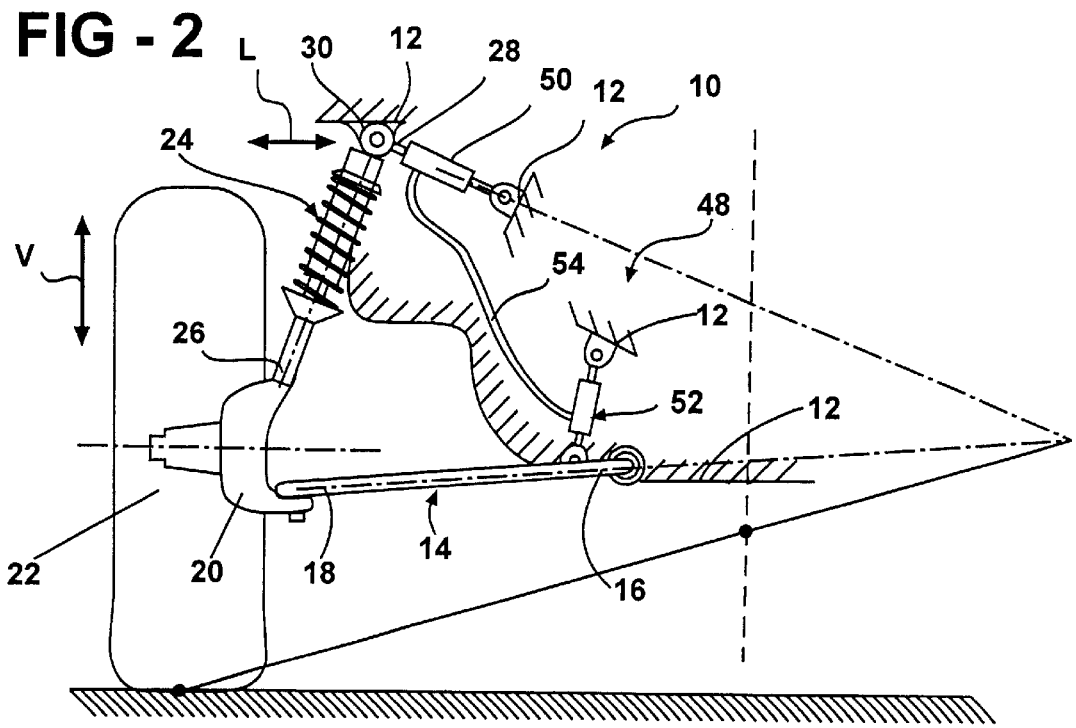

MOVABLE UPPER SUSPENSION MOUNT

BACKGROUND OF THE INVENTION

This invention relates to suspension assemblies for vehicles, and more particularly, the invention relates to suspension assemblies for changing the camber of a wheel during vehicle ride conditions.

A particular suspension assembly defines a suspension parameter such as caster, camber, and toe. It is often desirable to change these parameters during vehicle ride conditions such as vehicle roll. For example, it is desirable to change vehicle camber during vehicle roll conditions to provide better control over the vehicle. To this end, suspension assembly arrangements are utilized which incorporate a short upper arm and a long lower arm for supporting the knuckle. As the wheel moves up and down during vehicle roll conditions, the geometry of these suspension assemblies changes the wheel camber to provide better control of the vehicle. However, suspension assemblies incorporating upper and lower control arms are difficult to package in a vehicle and cannot be incorporated as often as desired. Instead, MacPherson or Chapman struts are often utilized, which do not permit the camber to change during vehicle roll conditions since the upper attachment or mount of the strut is fixed to the vehicle frame.

Suspension assemblies incorporating adjustable struts have been proposed to permit the wheel camber to be changed in response to vehicle roll conditions. In the prior art, the position of the upper strut mount is shifted laterally to change the wheel camber. The prior art suspension assemblies incorporate a sensor for sensing the steer angle, a controller for processing the information from the sensor, and an actuator for laterally shifting the upper strut mount. However, these active control systems may be costly in that a sensor and controller are required to precisely actuate the actuator. Therefore, what is needed is a simplified suspension assembly incorporating a strut, which changes the wheel camber in response to vehicle roll conditions.

SUMMARY OF THE INVENTION AND ADVANTAGES

The present invention provides a suspension assembly for a vehicle including a frame. A lower control arm having first and second opposing portions is pivotally connected to the frame at the first portion. A knuckle is supported on the second portion of the lower control arm with a wheel supported on the knuckle. A strut having a lower end is connected to the knuckle and an upper end of the strut is connected to the frame at an upper connection. The upper connection generally constrains the upper end of the strut against vertical movement while permitting limited lateral movement of the upper end relative to the frame. In one embodiment, a linkage assembly including a first linkage portion is interconnected between the lower control arm and the frame. A second linkage portion interconnects the upper end of the strut and the first linkage portion for moving the upper end laterally in the upper connection in response to vertical movement of the lower control arm. In a second embodiment, an adjustable linkage assembly including a first adjustable linkage is interconnected between the upper end and the frame. A second adjustable linkage is interconnected between the lower control arm and the frame and changes length in response to vertical movement of the lower control arm. A link interconnects the first and second adjustable linkages for communicating the change in length of the second adjustable linkage to the front adjustable linkage for moving the upper end laterally in the upper connection in response to vertical movement of the lower control arm.

Accordingly, the above invention provides a simplified suspension assembly incorporating a strut, which changes the wheel camber in response to vehicle roll conditions.

BRIEF DESCRIPTION OF THE DRAWINGS

Other advantages of the present invention can be understood by reference to the following detailed description when considered in connection with the accompanying drawings wherein:

FIG. 1 is a schematic view of a suspension assembly with a linkage assembly for moving the upper end of the strut; and FIG. 2 is a suspension assembly having an alternative linkage assembly for moving the upper end of the strut.

DETAILED DESCRIPTION OF THE PREFERRED EMBODIMENT

A suspension assembly 10 is shown in FIG. 1. The suspension assembly 10 includes a frame 12, which may incorporate multiple frame portions secured to one another. A lower control arm 14 includes first and second opposing portions 16 and 18. The first portion 16 of the lower control arm 14 is pivotally connected to the frame, and the second portion 18 supports a knuckle 20 having a wheel 22 supported thereon.

A strut 24 is interconnected between the knuckle 20 and the frame 12 for providing damping in response to vertical movement V of the wheel 22 from vehicle roll conditioned and other inputs from the roadway. The strut 24 includes a lower end 26 secured to the knuckle 20 and an upper end 28 connected to the frame 12 at upper connection 30. The upper connection 30 generally constrains the upper end 28 against vertical movement, but the upper connection 30 permits limited lateral movement of the upper end 28 of the strut 24 relative to the frame 12. By permitting limited lateral movement L of the upper end 28, the wheel camber may be changed during vehicle roll conditions.

The lower control arm 14 moves vertically during vehicle roll conditions. The vertical movement of the lower control arm 14 may be utilized to laterally move the upper end 28 during vehicle roll conditions to change wheel camber. In one embodiment shown in FIG. 1, a linkage assembly 32 may translate the vertical movement of the lower control arm 14 into lateral movement of the upper end 28 of the strut 24. The linkage assembly 32 includes first linkage portion 34 having a first link 36 connected to a second link 38 at an intermediate pivotal connection 40. The first link 36 is pivotally connected to the lower control arm 14 at a lower pivotal connection 42. The second link 38 is pivotally connected to frame 12 at an upper pivotal connection 44. A second linkage portion 46, which may include a third link 47 is interconnected between the upper end 28 and the first linkage portion 34. Preferably, the third link 47 is connected to the first linkage portion 34 at the intermediate pivotal connection 40.

In operation, as the lower control arm 14 moves vertically during a vehicle roll condition, the first link 36 will move upward and inward towards the frame 12. The second link 38 defines the movement of the first link 36 relative to the frame 12. As the first link 36 moves upward in response to an upward movement of the lower control arm 14, the upper end 28 of the strut 24 is moved laterally inward toward the vehicle frame 12 thereby changing the wheel camber. Conversely, as the lower control arm 14 moves downward, the upper end 28 of the strut 24 is moved laterally outward away from the vehicle frame 12. It is to be understood that while the movement of the upper end 28 is primarily in the lateral direction L, the upper end 28 may move a limited amount in the vertical direction. That is, the upper end 28 may move at a slight angle relative to horizontal, which may be appreciated from the slight angular orientation of the strut 24.

Another embodiment of the present invention is shown in FIG. 2. An adjustable linkage assembly 48 is utilized to translate the vertical movement V of the lower control arm 14 into lateral movement L of the upper end 28 of the strut 24. The adjustable linkage assembly 48 includes a first adjustable linkage 50 that is connected between the lower control arm 14 and the frame 12. The adjustable linkage assembly 48 further includes a second adjustable linkage 52 connected between the upper end 28 of the strut 24 and the frame 12. Preferably, the first and second adjustable linkages 50 and 52 are hydraulic cylinders. A link 54 is interconnected between the first and second adjustable linkages 50 and 52 for communicating the change in length of the second adjustable linkage 52 to the first adjustable linkage 50. The first adjustable linkage 50 changes in length in proportion to the change in length of the second adjustable linkage 52. Preferably, the link 54 is a fluid conduit for carrying hydraulic fluid between the first and second hydraulic cylinders 50 and 52.

In operation, the second adjustable linkage 52 shortens in response to an upward movement of the lower control arm 14. Hydraulic fluid is carried through the fluid conduit 54 from the second adjustable linkage 52 to the first adjustable linkage 50 to lengthen the hydraulic cylinder and move the upper end 28 laterally to change the wheel camber. Conversely, the hydraulic fluid moved from the first adjustable linkage 50 to the second adjustable linkage 52 through the link 54 in response to a downward movement of the lower control arm 14. Similar to the first embodiment, the upper end 28 moves primarily in the lateral direction L, but may move a slight amount in the vertical direction.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension assembly for a vehicle comprising:

a frame;

a lower control arm having first and second opposing portions with said first portion pivotally connected to said frame;

a knuckle supported on said second portion of said lower control arm with a wheel supported on said knuckle;

a strut having a lower end connected to said knuckle and an upper end connected to said frame at an upper connection with said upper connection generally constraining said upper end against vertical movement relative to said frame while permitting lateral movement of said upper end relative to said frame; and a linkage assembly including a first link operatively connected between said lower control arm and said frame and a second link interconnected between said upper end and said first link for moving said upper end laterally in said upper connection in response to vertical movement of said lower control arm.

2. The assembly according to claim 1, wherein said first link and said second link are connected to one another at a intermediate pivotal connection with said first link connected to said lower control arm at a lower pivotal connection and said second link connected to said frame at an upper pivotal connection.

3. The assembly according to claim 2, a third link pivotally connected to said frame and said intermediate pivotal connection.

4. The assembly according to claim 2, wherein said upper connection and said upper pivotal connection are in spaced relation from one another.

5. The assembly according to claim 2, wherein said lower pivotal connection and said knuckle are in spaced relation from one another.

6. The assembly according to claim 5, wherein said lower pivotal connection is arranged between said knuckle and said frame.

* * * * *